United States Patent
Hayashi et al.

[11] Patent Number: 6,025,653
[45] Date of Patent: Feb. 15, 2000

[54] ENGINE START CONTROL DEVICE

[75] Inventors: Kazuhiko Hayashi, Aichi-Gun; Satoru Matsumoto, Toyota, both of Japan

[73] Assignee: Toyota Jidosha Kabushiki Kaisha, Toyota, Japan

[21] Appl. No.: 09/172,624

[22] Filed: Oct. 15, 1998

Related U.S. Application Data

[63] Continuation of application No. PCT/JP97/00892, Mar. 19, 1997.

[30] Foreign Application Priority Data

Apr. 16, 1996 [JP] Japan .................................. 8-094537

[51] Int. Cl.[7] .................................................... G08G 1/123
[52] U.S. Cl. ............................................. 290/33; 307/10.2
[58] Field of Search ................... 290/33, 34, 35; 307/10.2, 10.3; 340/426

[56] References Cited

U.S. PATENT DOCUMENTS

| | | | |
|---|---|---|---|
| 5,079,435 | 1/1992 | Tanaka | 307/10.2 |
| 5,555,863 | 9/1996 | Kokubu | 123/179.3 |
| 5,610,574 | 3/1997 | Mutoh et al. | 340/426 |
| 5,641,998 | 6/1997 | Maeda et al. | 307/10.2 |
| 5,670,933 | 9/1997 | Hayashi | 340/426 |
| 5,679,984 | 10/1997 | Talbot et al. | 307/10.3 |
| 5,686,883 | 11/1997 | Mutoh et al. | 340/426 |
| 5,774,043 | 6/1998 | Mizuno et al. | 340/426 |
| 5,796,178 | 8/1998 | Onuma | 307/10.2 |
| 5,883,444 | 3/1999 | Hirata et al. | 307/10.3 |

FOREIGN PATENT DOCUMENTS

| | | |
|---|---|---|
| 64-33876 | 3/1989 | Japan . |
| 1-116165 | 5/1989 | Japan . |
| 5-039766 | 2/1993 | Japan . |
| 5-296129 | 11/1993 | Japan . |
| 6-227364 | 8/1994 | Japan . |
| 7-186888 | 7/1995 | Japan . |
| 8-072672 | 3/1996 | Japan . |
| 8-244558 | 9/1996 | Japan . |
| 8-282443 | 10/1996 | Japan . |
| 8-282444 | 10/1996 | Japan . |
| 9-014109 | 1/1997 | Japan . |
| 9-095210 | 4/1997 | Japan . |
| 9-137746 | 5/1997 | Japan . |
| 9-142256 | 6/1997 | Japan . |

*Primary Examiner*—Nicholas Ponomarenko
*Attorney, Agent, or Firm*—Pillsbury Madison & Sutro, LLP

[57] ABSTRACT

In an engine start control device useful as a vehicle robbery prevention device, a reference code is stored in EEPROM (20a) of an immobilizer ECU (20), and a processor (20b) compares a key code transmitted from a transponder (12) of a key (10) with the reference code. Subsequently, in case of an inconsistency, a signal L is transmitted to an engine ECU (24) to stop an engine (30), but when the collation is not completed or when another communication is not performed, the immobilizer ECU (20) transmits to the engine ECU (24) a start code encoded in an encoder (20c). The engine ECU (24) decodes the start code by a decoder (24b) to recognize it. Subsequently, if the start code cannot be recognized, the engine (30) is stopped. Thereby, in a case where a communication line connecting the immobilizer ECU (20) and the engine ECU (24) is disconnected, the engine (30) can be stopped.

4 Claims, 6 Drawing Sheets

ENGINE START CONTROL DEVICE

This is a continuation of application International application No. PCT/JP97/00892 filed Mar. 19, 1997, which designated the U.S.

BACKGROUND OF THE INVENTION

Field of the Invention

The present invention relates to an engine start control device, and especially to a device for stopping an engine when it is decided that an operation for starting the engine was performed without performing a correct key operation.

Description of the Prior Art

In a car or the like, a locking device releasable by a correct key is disposed in a door or the like, and an engine can be started only by a correct ignition key. Vehicle theft is prevented in this manner, but to further guard against theft, additional theft prevention mechanisms are proposed, and increasingly put to practical use.

For example, in Automobile Technique Case Examples/Issuance No. 95603 (issued by Intellectual Property Division of Japan Automobile Industry Association on Dec. 1, 1995), a vehicle robbery prevention device is disclosed which interlocks with an ignition key, and prohibits engine start when a correct ignition key is not used.

The vehicle robbery prevention device incorporates therein a transponder for transmitting a key code to the ignition key. The transponder receives electric power to transmit the stored key code from electric waves from an antenna mounted on a key cylinder. The antenna of the key cylinder is connected to an immobilizer ECU, in which it is judged whether or not the transmitted key code is correct. The immobilizer ECU is further connected to an engine ECU for controlling engine ignition and fuel supply (fuel injection), and informs the engine ECU whether the correct key code has been obtained. When the correct key code cannot be obtained by the immobilizer ECU, the engine ECU inhibits the ignition and the supply of fuel to the engine to control or stop the engine. Therefore, the starting of the engine or the operating of the vehicle can be prevented when the engine is started without using a correct key. Additionally, as the ignition is turned on by operating the ignition key, the engine ECU starts the engine as usual, and receives a signal from the immobilizer ECU to stop the engine.

Here, in an initial state after the engine is started, a starter motor is rotated, and power supply voltage varies largely. Therefore, communication of the immobilizer ECU and the engine ECU is performed after the number of revolutions of the engine reaches/exceeds 500 rpm.

Specifically, when the number of engine revolutions reaches/exceeds 500 rpm, the engine ECU prepares a predetermined rolling code A by generation of random numbers, and transmits the code to the immobilizer ECU. In a case where the immobilizer ECU can recognize a correct key, the immobilizer ECU similarly generates a rolling code B by the generation of random numbers, and returns the code to the engine ECU. Thereby, it is confirmed that the engine ECU uses the correct key. After a processing for confirming the key is completed, a usual engine operation is continued.

On the other hand, if the correct rolling code B is not returned in a predetermined time, the engine ECU stops the ignition and the fuel injection. Therefore, the engine is stopped when it is determined that an operation was not performed with a correct key.

Furthermore, in the conventional device described above, when, as a result of code collation, the immobilizer ECU determines that the vehicle has been stolen, the level of a communication line to the engine ECU is immediately set to a level L. Subsequently, the engine ECU detects the level L of the communication line to stop the engine. Therefore, in the device, the engine can be stopped in early stages when theft is determined.

However, in the above-mentioned art, if the communication line from the immobilizer ECU to the engine ECU is fixed to a level H, the engine does not stop for several seconds (until it is confirmed that the rolling code is not returned) after the rate of engine revolutions reaches 500 rpm. Therefore, the vehicle may travel some distance. Especially, since the communication line is frequently pulled up inside ECU, the communication line is set to the level H by cutting the communication line. Consequently, by cutting the communication line from the immobilizer ECU to the engine ECU, the vehicle may run for some degree.

Here, it can be supposed that a time for accepting the returning of the rolling code be shortened, but the need to prevent detection error in a case where a correct rolling code is returned limits how much that time can be shortened.

The present invention has been developed to solve the aforementioned problem, and an object thereof is to provide an engine start control device which can effectively prevent a vehicle from being driven by cutting communication from an immobilizer ECU to an engine ECU.

Here, it can be supposed that a time for accepting the returning of the rolling code be shortened, but the time cannot be shortened very much in order to prevent detection error in a case where a correct rolling code is returned.

The present invention has been developed to solve the aforementioned problem, and an object thereof is to provide an engine start control device which can effectively prevent a vehicle from being driven by cutting communication from an immobilizer ECU to an engine ECU.

SUMMARY OF THE INVENTION

The present invention includes a start enabling signal output means for outputting an engine start enabling signal when a key is operated to start an engine, a collating means for collating a key code and a predetermined reference code, and an engine start control means for controlling engine start in accordance with whether or not there is a reception of said start enabling signal and a collation result of said collating means. The start enabling signal output means encodes and outputs the start enabling signal, while the start control means decodes the encoded start enabling signal to detect whether the start enabling signal is received.

According to the present invention, when key operation is performed to start the engine, the start enabling signal output means outputs the start enabling signal. Upon reception of the start enabling signal, the engine start control means continues the engine start. The start enabling signal is encoded, and the start control means decodes the signal to judge whether the start enabling signal is received. If the start enabling signal output means is disconnected from the engine start control means, the engine start control means can not receive the start enabling signal, and the engine start is inhibited. Therefore, even if a robber constantly sets a terminal of the engine start enabling signal to a level H by disconnecting a communication line or by another measure, this can be prevented from being mistaken for the start enabling signal to permit the start.

Moreover, another aspect of the present invention includes a collating means for collating a key code and a predetermined reference code, a start enabling signal output means for outputting an engine start enabling signal when a key is operated to start an engine, a start disabling signal output means for outputting an engine start disabling signal in a case where coincidence of the key code and the reference code collated by the collating means cannot be detected, and an engine start control means for controlling engine start in response to the start enabling signal and the start disabling signal. The start enabling signal output means includes an encoding means for encoding the engine start enabling signal, the start control means includes a decoding means for decoding the start enabling signal encoded by the encoding means, and the engine start control means inhibits the engine start not only when the start disabling signal is received but also when the encoded engine start enabling signal cannot be received.

In the present invention, the collating means collates the key code and the reference code. Subsequently, when the codes do not coincide with each other, the start disabling signal output means outputs the start disabling signal. Subsequently, the engine control means inhibits the engine start in response to the start disabling signal. Therefore, when it is determined that a correct key has not been used, the engine start can be inhibited. Furthermore, the engine start is inhibited by the engine start control means when the encoded start enabling signal cannot be received. Therefore, when a communication line to the engine start control means is cut off, and the engine start control means constant receipt of a signal of the level H is prevented from being mistaken for reception of the start enabling signal.

As mentioned above, by using the encoded start enabling signal, the engine can be prevented from being started by a robber's cutting the communication line to drive a vehicle with the engine mounted thereon.

Moreover, in a still further aspect of the present invention, the engine start control device described above also includes a failure counter for counting the number of continued abnormal terminations in an engine start processing by the previous time. In accordance with the number, the start control means successively shortens a waiting time until the rolling code is received after the start enabling signal is received.

By successively shortening the waiting time for reception of the rolling code in accordance with the number of continued abnormal terminations, a vehicle travel by repeated unjust use can be suppressed to a predetermined, or shorter, distance.

DESCRIPTION OF THE PREFERRED EMBODIMENTS

A preferable mode for practicing the present invention, hereinafter referred to as the preferred embodiment, will be described below with reference to the above described drawings.

Figure 1:
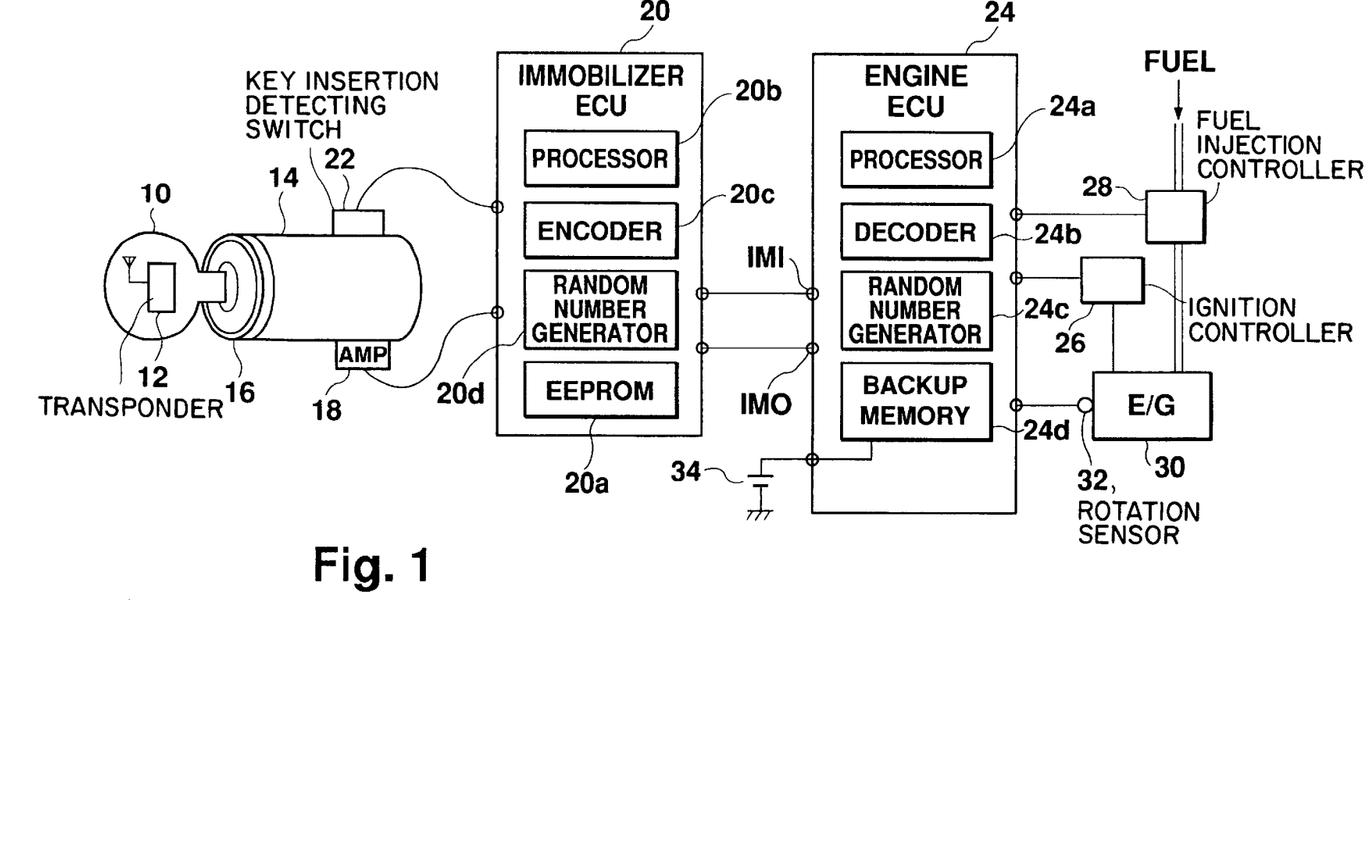
FIG. 1 is a block diagram showing an entire system according to the present invention.

FIG. 1 is a diagram showing the entire system of a vehicle robbery prevention device using an engine start control device according to the preferred embodiment of the present invention. A transponder 12 is built into an ignition key 10 which is also used for opening and closing a car door lock. The transponder 12 includes an antenna, a power circuit, a memory, a reading circuit, a transmission circuit, and the like. When a predetermined radio wave is received from the outside, the transponder 12 receives the radio wave at the antenna to supply the radio wave to the power circuit. The power circuit obtains an electric power from the received radio wave to supply the electric power to an inner circuit. Subsequently, a code number stored in the memory is read, and transmitted from the antenna via the transmission circuit.

A key cylinder 14 can be rotated by the ignition key 10 having a predetermined configuration (or a predetermined magnetization, or the like), and an accessory switch, an ignition switch, a starter switch, and other various switches are operated in accordance with the rotary position of the key cylinder in the same manner as in a normal case. Specifically, the turning on/off of a power supply of an accessory apparatus is controlled by the accessory switch, the turning on/off of a power supply of an ignition plug or another apparatus necessary for run is controlled by the ignition switch, and the turning on/off of a power supply of a starter motor is controlled by the starter switch. Additionally, rotation can be performed only when a tip end of the inserted ignition key 10 is matched with the key cylinder 14.

An antenna 16 is disposed on a periphery on the side of a front face of the key cylinder 14 (on the side to which the key 10 is inserted). A predetermined radio wave is transmitted to the transponder 12 from the antenna 16, and a radio wave from the transponder 12 is received by the antenna 16.

The antenna 16 is connected to an immobilizer ECU 20 via an amplifier 18 for amplifying a received signal. Additionally, the key cylinder 14 is provided with a key insertion detecting switch 22, so that a signal indicating whether or not the key 10 is inserted is supplied to the immobilizer ECU 20. Therefore, the immobilizer ECU 20 can detect the insertion at the time the key 10 is inserted, transmit the predetermined radio wave from the antenna 16 at the time, and receive a return from the transponder 12.

The immobilizer ECU 20 stores therein a reference code corresponding to a key code of the key 10. In the example, the reference code is stored in EEPROM 20a. Subsequently, a processor 20b determines whether the key code transmitted from the transponder 12 via the antenna 16 coincides with the reference code.

Moreover, the immobilizer ECU 20 is connected to an engine ECU 24 via a communication line. The engine ECU 24 has a terminal IMI via which a signal from the immobilizer ECU 20 is received, and a terminal IMO via which a signal is transmitted to the immobilizer ECU 20.

The engine ECU 24 controls an ignition (plug ignition) controller 26 and a fuel injection (fuel supply) controller 28. The ignition controller 26 and the fuel injection controller 28 are connected to an engine 30, so that the engine ignition and the fuel supply are controlled.

Specifically, the engine ECU 24 brings about a state in which the electric power supply to the ignition plug and the fuel supply to the engine are allowed, when the ignition is turned on by rotating the key cylinder 14. Subsequently, as the engine 30 is rotated accompanying the rotation of the starter motor, ignition and fuel supply are performed in a predetermined manner. Even after the engine 30 is driven to start rotating, the ignition and the fuel supply are controlled.

The engine ECU 24 is connected to a rotation sensor 32 which is attached to the engine 30 for detecting the number of engine revolutions, so that the number of revolutions of the engine 30 is detected.

The immobilizer ECU 20 is provided with an encoder 20c and a random number generator 20d. The encoder 20c generates a start code while the immobilizer ECU 20 is operating, while the random number generator 20d generates a predetermined rolling code B. Additionally, the immobilizer ECU 20 is provided with a transmission/reception circuit for performing communication via the antenna 16, a communication interface for performing communication with the engine ECU 24, and the like.

Moreover, the engine ECU 24 is provided with a processor 24a, a decoder 24b, a random number generator 24c, and a backup memory 24d. The decoder 24b decodes the start code transmitted from the immobilizer ECU 20, while the random number generator 24c generates a predetermined rolling code A. Furthermore, a counted value, a flag, and the like necessary for the next processing are stored in the backup memory 24d. Additionally, the processor 24a performs various processings, and the engine ECU 24 is also provided with a communication interface for performing communication with the immobilizer ECU, and the like.

Additionally, the backup memory 24d is a SRAM to which an electric power is constantly supplied from a battery 34 to hold a memory content. Moreover, the batter 34 supplies an electric power for operating various apparatuses.

Figure 2:
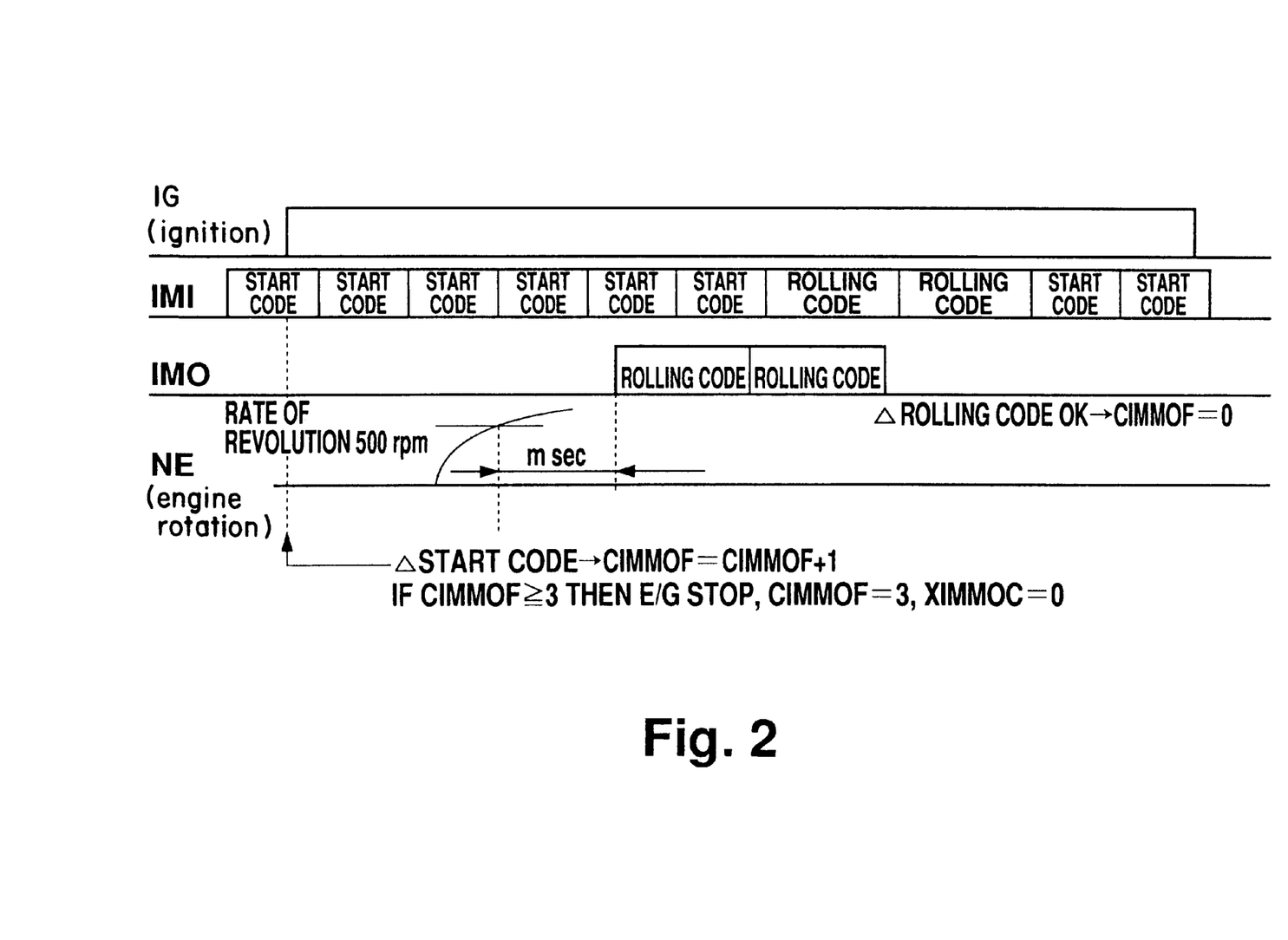
FIGS. 2 and 3 are timing charts showing an operation of an embodiment of the present invention.
Figure 3:
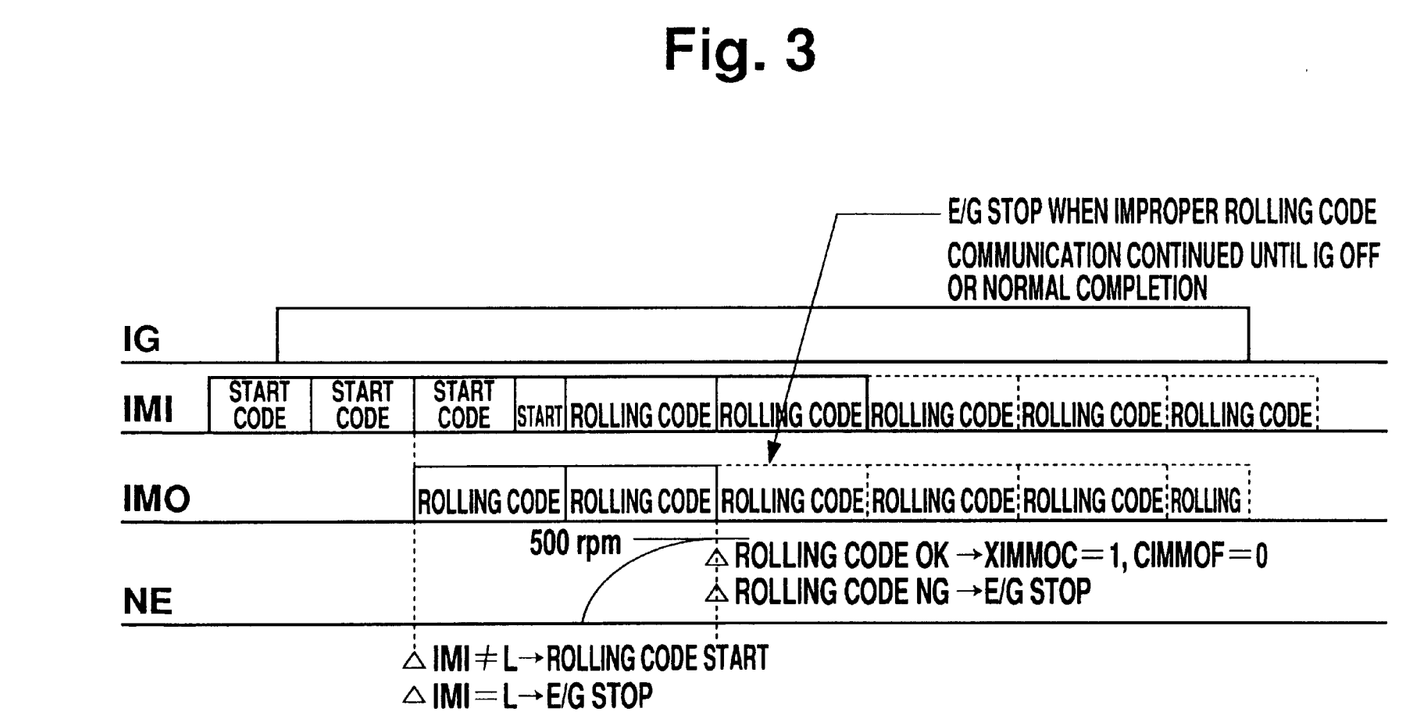
Figure 4:
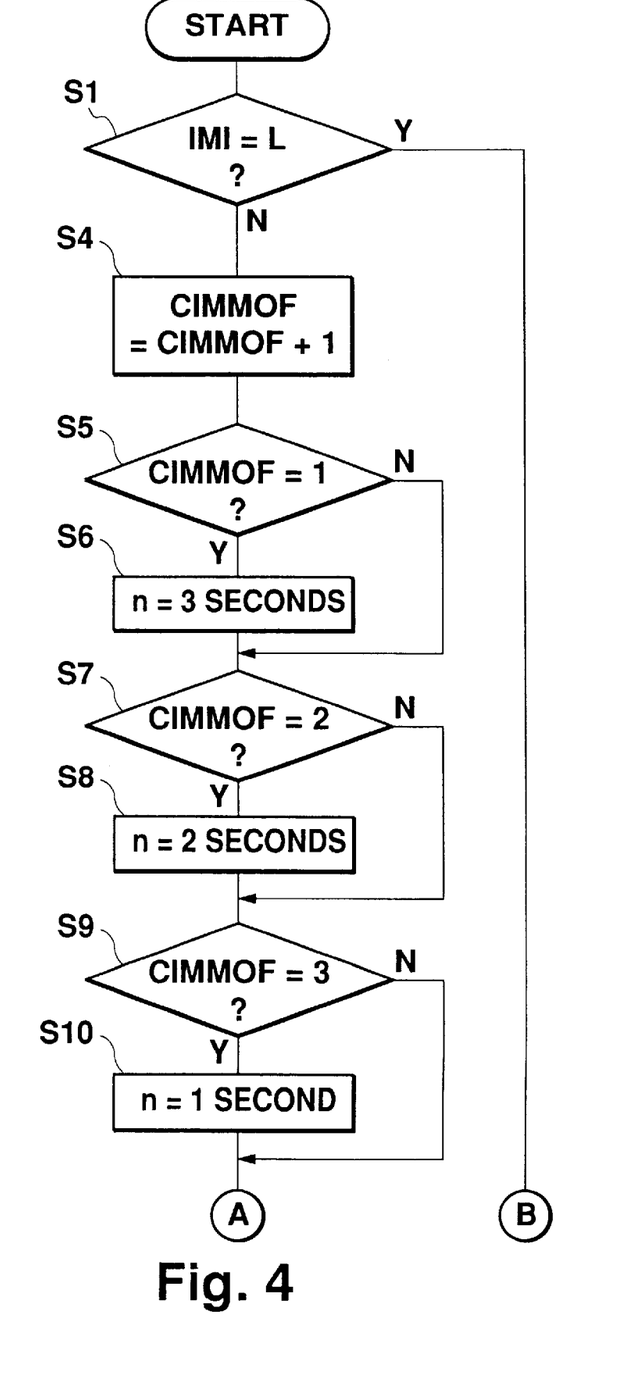
FIGS. 4–6 are flowcharts showing the operation of the embodiment of the present invention.
Figure 5:
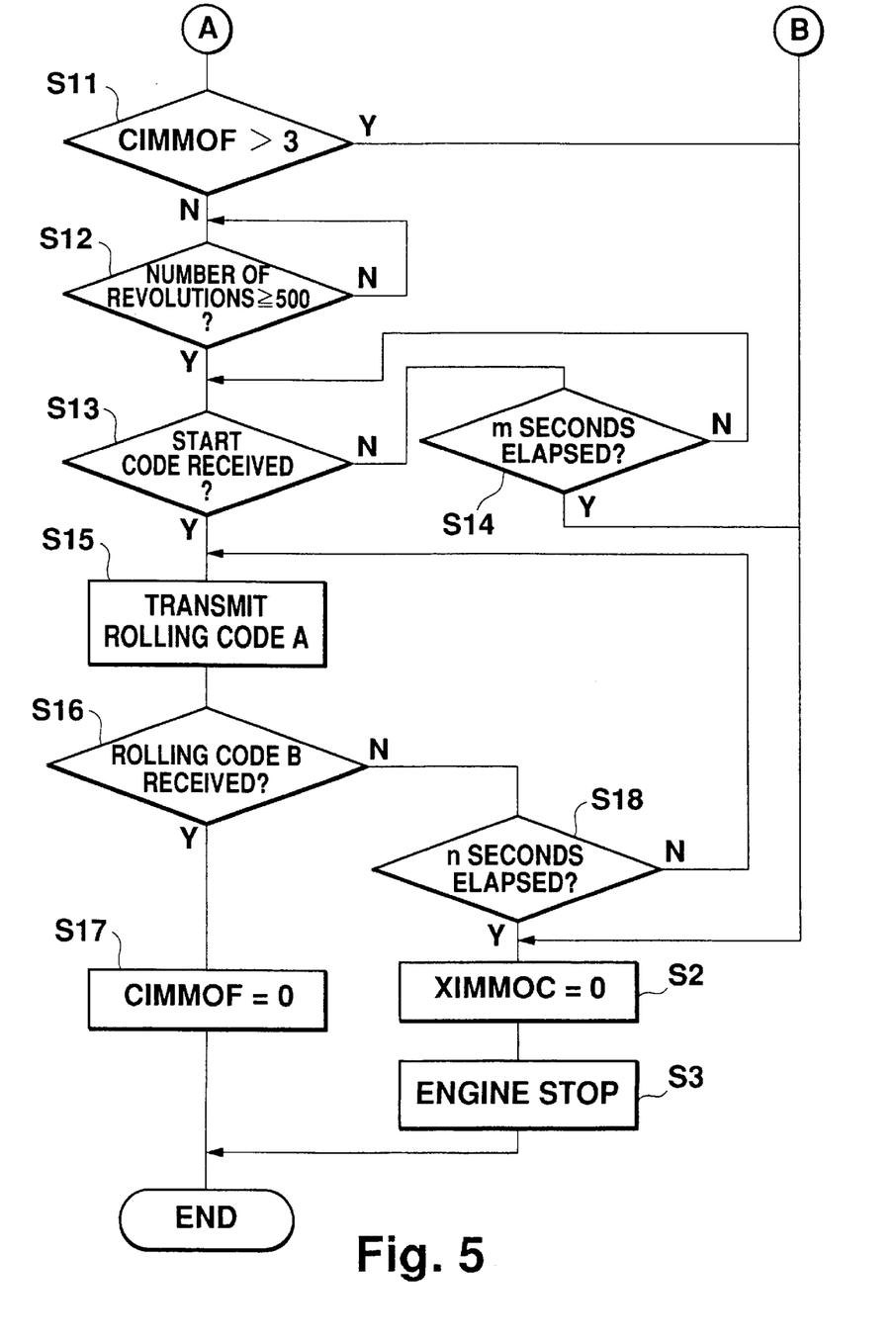
Figure 6:
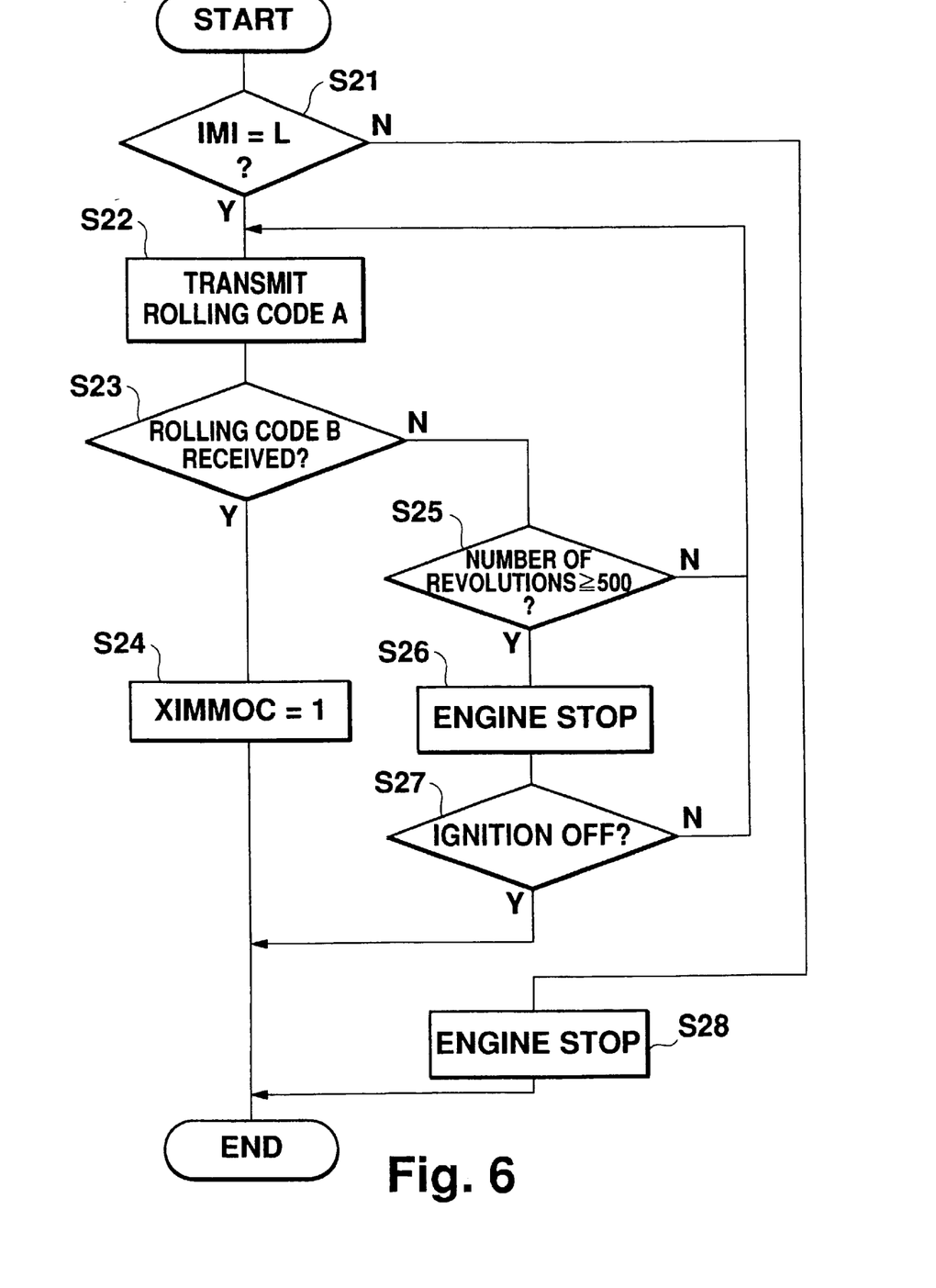

Operation of the system will next be described based on the timing charts of FIGS. 2 and 3 and the flowcharts of FIGS. 4, 5 and 6.

First, when a driver inserts the ignition key 10 into a key groove in the key cylinder 16, the key insertion detecting switch 22 detects the insertion, a power supply is started up, and each section starts its operation. Specifically, the immobilizer ECU 20 starts transmitting a start code to the engine ECU 24, while waiting for reception of a signal from the antenna 16. Subsequently, when the signal from the antenna 16 is received, it is determined whether the key code transmitted from the transponder 12 coincides with the reference code stored in EEPRON 20a.

When the codes coincide, the immobilizer ECU waits for reception of the rolling code A while sending the start code, and returns the rolling code B at the time of the reception of rolling code A. On the other hand, when the key code does not coincide with the reference code, the communication line to the engine ECU 24 is fixed to the level L. Additionally, in a case where the key insertion detecting switch 22 is not disposed, operation may be started by turning on the accessory switch or the ignition switch.

Subsequently, as the ignition switch is turned on in response to the operation of the key 10, the engine ECU 24 brings about a state in which the engine 30 can be operated by the ignition controller 26 and the fuel injection controller 28. Furthermore, the turning on of the starter switch results in the turning on of the starter motor, and the engine starts rotating, so that the ignition and the fuel supply are started.

As mentioned above, by turning on the key insertion detecting switch 22 or the accessory switch, the operation of the immobilizer ECU 20 is started, and the start code is generated in the encoder 20c and starts to be transmitted. Thereby, as shown in FIG. 2, the start code appears on the terminal IMI of the engine ECU 24. The start code is repeatedly sent by the immobilizer ECU 20. Additionally, as the start code, a cryptography formed by a combination of levels H and L, PWM (pulse width modulation), PSK (phase shift keying), and other various means can be applied. "Flag XIMMOC"

First, the engine ECU determines the value of a flag XIMMOC which is set to zero in a routine which is first performed after a battery is first connected. The flag XIMMOC is also set to zero when there is an error at the time of the previous engine start, and set to one when the engine start is normally completed.

Therefore, at the beginning of a processing in the engine ECU 24, by checking the value of the flag XIMMOC, it is determined whether the battery is once cut and whether there is an error in the previous time. Additionally, the flag XIMMOC is stored in the backup memory 24d of the engine ECU 24. Therefore, the flag is not reset until the battery is disconnected.

A case where the flag XIMMOC equals 1 and the previous engine start is normal will be described based on FIGS. 2, 4 and 5.

First, the engine ECU 24 monitors from the turning-on state of the ignition switch whether the terminal IMI via which communication from the immobilizer ECU 20 is received is set to L. The determination is performed by measuring a time during which the terminal IMI continues to be in the level L with a counter or the like, and by detecting that the time has reached or exceeded a predetermined value. Additionally, determination of S1 is continually performed.

The terminal IMI being in the level L indicates that the immobilizer ECU 20 outputs L, and means the detection of injustice. After the flag XIMMOC is set to zero (S2), the engine is stopped (S3).

Thereby, when inconsistency of the key code and the reference code or some injustice is detected in the immobilizer ECU 20, and the communication line is set to the level L, this is detected in the engine ECU 24 by the level L of the terminal IMI. Subsequently, since the engine ECU 24 inhibits the ignition and the fuel injection, the engine 30 is stopped.

Subsequently, when the level H is detected on the terminal IMI, 1 (one) is added to a failure counter CIMMOF (S4). As previously mentioned, in the present embodiment, the counter CIMMOF indicating the number of continued abnormal terminations in the engine start processing is counted up in the beginning of operation. Therefore, at the time of abnormal termination of the processing, the counter CIMMOF can be summed. Specifically, when the ignition switch is turned off during the processing, the counter CIMMOF is counted up. Additionally, the counter CIMMOF is stored in the backup memory 24d.

When the counter CIMMOF is summed, it is determined whether CIMMOF indicates one. Specifically, if there is no previous error, the counter CIMMOF indicates zero, and CIMMOF becomes one. Therefore, in this case, the waiting time of reception of the rolling code B is set to a maximum value of n-seconds, e.g., three seconds (S6). Moreover, if CIMMOF equals 2, n equals two seconds (S7, S8), and if CIMMOF equals 3, n is set to one second (S9, S10). In this manner, by successively setting the value of n smaller in accordance with the value of the counter CIMMOF, the waiting time for the rolling code B in the engine ECU 24 is successively shortened, and a distance of vehicle run by repetition of unjust use can be suppressed to within a predetermined value.

Subsequently, if it is determined whether CIMMOF is larger than 3 (S11) to detect that CIMMOF is larger than 3, the process goes to S2 and S3 to stop the engine 30. Thereby, the engine 30 can be stopped in early stages, and the run by an unjust start operation can completely be inhibited.

When the counter CIMMOF indicates three or less, it is next determined whether the rate of engine revolution reaches 500 rpm (S12). Subsequently, the determination is repeated until the rate of engine revolution reaches 500 rpm, and, when 500 rpm are reached, it is determined whether the start code is received (S13). The detection of the start code itself is repeatedly performed from the beginning of the processing.

If it is determined in S13 that some signal is received in the terminal IMI of the engine ECU 24 but it is different from the start code, it is determined whether m-seconds (e.g., 500 msec) have elapsed since the rate of engine revolution has reached 500 rpm (S14). Subsequently, if the start code cannot be received even after m-seconds have elapsed, the flag XIMMOC is set to zero (S2), and the engine is stopped (S3).

By using the start code in this manner, not only the sending of the level L from the immobilizer ECU 20 but also the fixing to the level H of the terminal IMI by the disconnection of the line can be detected as abnormality. The engine 30 can also be stopped in this case.

On the other hand, if the start code can be received in S13, the engine ECU 24 transmits the rolling code A to the immobilizer ECU 20 (S15). The rolling code A is transmitted by the random number generator 24c in the engine ECU in a predetermined system.

Here, the immobilizer ECU 20 detects the coincidence of the received key code and the reference code stored in EEPROM 20a by collating them. If the reception of the rolling code A is confirmed, the immobilizer ECU 20 uses its inside random number generator 20d to generate the rolling code B corresponding to the rolling code A. Since the random number generating mechanisms in the engine ECU 24 and the immobilizer ECU 20 are constituted beforehand in such a manner that they correspond to each other, the generated rolling codes A and B necessarily correspond to each other. Subsequently, the immobilizer ECU 20 transmits the rolling code B to the engine ECU 24. Additionally, at the time the key code does not coincide with the reference code, the immobilizer ECU 20 sets the communication line to the level L. The engine ECU 24 constantly monitors the state of the terminal IMI. At the time the level L of IMI is detected, the engine 30 is stopped.

The engine ECU 24 determines whether the rolling code B corresponding to the rolling code A transmitted by itself is received (S16). If the correct rolling code B is received, the counter CIMMOF is set to zero (S17), and the processing is completed after the value of CIMMOF is reset to zero. Therefore, only when the processing is normally completed, the counter CIMMOF is reset to zero.

On the other hand, if the rolling code A is transmitted but the correct rolling code is not returned, operation is not normally performed. In this case, therefore, it is determined whether n-seconds have elapsed (S18). Subsequently, the determination of reception of the rolling codes A and B is repeated for n-seconds. If the rolling code B cannot be received within n-seconds, the process goes to S12 to set XIMMOC to zero (S2), while the engine 30 is stopped (S3).

Here, the value of n is any one of three, two and one second set in S6, 8 and 10. Therefore, every time the engine start operation abnormally ends, the reception waiting time is reduced. Especially, since CIMMOF counts up before the engine start as aforementioned, the processing for reducing the waiting time is performed even if the ignition is turned off during the start processing.

Additionally, after the number of engine revolutions reaches 500 rpm, the detection of the start code and the transmission and reception of the rolling code are performed because, when the number of engine revolutions of 500 rpm or less, there is a high possibility that the starter motor is being operated. At that time the probability of error generation is high because the power supply voltage is unstable.

In this manner, the immobilizer ECU 20 informs the engine ECU 24 that the operation is normal by the start code rather than by the H level of the communication line. Therefore, when the communication line is cut off, no start code is transmitted. When the start code is not transmitted, the engine ECU 24 can stop the engine. Additionally, the immobilizer ECU 20 repeats the transmission of the start code even after the rolling code B is transmitted. The engine ECU 24 can constantly confirm the connection of the communication line. Moreover, re-starting can easily be performed at the time of an engine stall or in another case.

As mentioned above, the processing in a case where there is no error in the previous processing, i.e., where the flag XIMMOC equals one is performed. Moreover, when abnormality is detected to stop the engine 30, XIMMOC is set to zero.

A case after the battery is disconnected or when abnormality is determined in the previous engine start processing (the flag XIMMOC equals zero) will be described based on FIGS. 3 and 6.

Even in this case, the immobilizer ECU 20 sets the communication line to the engine ECU 24 to the level L if injustice is detected. The engine ECU 24 monitors the terminal IMI to determine whether it is fixed to the level L (S21). Subsequently, if the terminal IMI is fixed to L, the engine 30 is stopped (S28).

On the other hand, if the level H in the terminal IMI is detected, the engine ECU 24 immediately enters a routine of checking the rolling code. Specifically, the engine ECU 24 immediately starts transmitting the rolling code A from the terminal IMO without waiting for the rate of engine revolution to reach 500 rpm (S22). The immobilizer ECU 20 transmits the start code as long as injustice is not detected. However, if the rolling code A is received from the engine ECU 24, the immobilizer ECU generates the corresponding rolling code B to return it to the engine ECU 24.

While transmitting the rolling code A from the terminal IMO, the engine ECU 24 monitors the state of the terminal IMI to determine whether the rolling code B is received (S23). Subsequently, when the rolling code B can be received, the flag XIMMOC is set to one (S24), thereby ending the processing.

On the other hand, if the rolling code B cannot be received, it is determined whether the rate of engine revolution reaches 500 rpm (S25). Subsequently, the transmission of the rolling code A and the determination of reception of the rolling code B are repeated until the rate of engine revolution reaches 500 rpm. If the rolling code B cannot be detected before the rate of engine revolution reaches 500 rpm, the engine is stopped (S26). As a normal vehicle cannot travel when the engine is revolving at less than 500 rpm, the processing securely prevents the running.

Furthermore, after the engine 30 is stopped in S26, it is determined whether the ignition is turned off (S27). If the ignition is not turned off, the process returns to S22. Thereby, the transmission of the rolling code A from the engine ECU 24 and the transmission of the rolling code B in the immobilizer ECU 20 are continued until the ignition is turned off. Therefore, even after the engine is stopped, the engine ECU 24 can receive the rolling code B. If the rolling code B can be received in S23, the flag XIMMOC is reset to one (S24). Therefore, the next engine start can be performed while XIMMOC equals one.

Additionally, if XIMMOC equals zero, the value of the Ah counter CIMMOF is not used in the processing. Therefore, CIMMOF is preferably reset to zero in the beginning of the processing. Moreover, at the time XIMMOC is set to one, CIMMOF may be reset to zero.

If the ignition is turned off in S27, the processing is completed. Therefore, if the rolling code B cannot be received until the ignition is turned off, the flag XIMMOC remains at zero.

By performing transmission and reception of the rolling code even after the engine is stopped, circumstances that inhibit the engine start can be prevented in case of no injustice. Specifically, communication error easily occurs until the number of engine revolutions reaches 500 rpm, and the correct rolling code transmission may not be performed even if there is no injustice. On the other hand, after the engine is stopped, the starter motor is not operated, and a secure communication can be performed. Therefore, the failure of the engine to start because of communication error can be prevented.

As described above, in the present embodiment, when the supply of electric power to the backup memory 24$d$ is disconnected, and the content is cleared, the transmission and reception of the rolling code in the next processing are performed in early stages. Specifically, if the communication of the rolling code is not normally completed until the number of engine revolutions reaches 500 rpm, the engine is stopped. Therefore, in a case where a backup power supply line is disconnected or in another case, the engine fails to reach 500 rpm, and the running of the vehicle can be securely stopped. Especially, since the value of the flag XIMMOC at the time of abnormality is set to zero, the value of the flag XIMOC can easily be set when the memory content is cleared by turning off the power supply. Specifically, by resetting the flag XIMMOC to zero at the time of normal initial operation, the abnormality in the previous time can be set.

INDUSTRIAL APPLICABILITY

According to the present invention, if the previous engine start is normally completed, the counter counts the number of continued abnormal terminations in the engine start processing, and the waiting time for reception of the rolling code in the engine ECU is successively set smaller in accordance with the counted value. Therefore, the distance the vehicle is able to travel by repeating unjust operations can be suppressed to within a predetermined value.

Moreover, if the battery is disconnected or the previous engine start is abnormally completed, the transmission/reception of the rolling code in the next processing is performed in early stages. If the communication of the rolling code is not normally completed until the number of engine revolutions reaches 500 rpm, the engine is stopped. Thereby, running can be more securely stopped.

Furthermore, in the present invention, the encoded start code is used, and the engine is stopped if the start code cannot be obtained. Therefore, in the case where the communication line is just disconnected or in another case, the start code cannot be received, and the engine can be stopped.

As aforementioned, the engine start control device of the present invention is useful as a vehicle robbery prevention device.

What is claimed is:

1. An engine start control device comprising:
    an immobilizer ECU for outputting an engine start code when a key is operated to start an engine, the immobilizer ECU including collating means for collating a key code and a predetermined reference code; and
    an engine ECU, coupled to the immobilizer ECU, for controlling engine start based on reception of said start code and a collation result of said collating means,
    said immobilizer ECU encoding and outputting the start code, and said engine ECU decoding said encoded start code to detect whether the start code is received.

2. The engine start control device according to claim 1, further comprising a failure counter for counting sequential abnormal terminations of engine start processing, and in accordance with the counted number of sequential abnormal terminations, said engine ECU changing a time period for which the engine ECU waits to receive a rolling code from the immobilizer ECU before disabling engine start.

3. The device of claim 1, wherein the immobilizer ECU encodes the start code using at least one of pulse width modulation and phase shift keying.

4. An engine start control device comprising:
    an immobilizer ECU including collating means for collating a key code and a predetermined reference code means for outputting an engine start enabling signal when a key is operated to start an engine, and means for outputting an engine start disabling signal when coincidence of the key code and the reference code is not detected by said collating means; and
    an engine ECU, coupled to the immobilizer ECU, for controlling engine start in response to said start enabling signal and the start disabling signal,
    said means for outputting the engine start enabling signal including encoding means for encoding the start enabling signal,
    the engine ECU including code decoding means for decoding the start enabling signal encoded by said encoding means, and
    said engine ECU inhibiting the engine start when the start disabling signal is received and when the encoded start enabling signal is not received.

* * * * *